US012006788B2

(12) United States Patent
Mair

(10) Patent No.: US 12,006,788 B2
(45) Date of Patent: Jun. 11, 2024

(54) PASSIVE PRESSURE APPLICATION AND REGULATION OF DOWNHOLE HYDRAULIC DEVICES

(71) Applicant: Halliburton Energy Services, Inc., Houston, TX (US)

(72) Inventor: Ryan David Mair, Westhill (GB)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 219 days.

(21) Appl. No.: 17/665,411

(22) Filed: Feb. 4, 2022

(65) Prior Publication Data

US 2023/0250706 A1 Aug. 10, 2023

(51) Int. Cl.

| | |
|---|---|
| ***E21B 34/08*** | (2006.01) |
| ***E21B 23/04*** | (2006.01) |
| ***E21B 43/38*** | (2006.01) |
| ***F15B 13/02*** | (2006.01) |

(52) U.S. Cl.

CPC .......... *E21B 34/08* (2013.01); *E21B 23/0412* (2020.05); *E21B 43/38* (2013.01); *F15B 13/024* (2013.01)

(58) Field of Classification Search

CPC ...... E21B 34/08; E21B 23/0412; E21B 43/38; F15B 13/024

See application file for complete search history.

(56) References Cited

U.S. PATENT DOCUMENTS

| | | | | |
|---|---|---|---|---|
| 4,796,699 A * | 1/1989 | Upchurch | E21B 41/00 166/264 |
| 7,303,020 B2 | 12/2007 | Bishop et al. | |
| 7,503,385 B2 | 3/2009 | Tips et al. | |
| 7,654,333 B2 | 2/2010 | Smith | |
| 8,210,267 B2 | 7/2012 | Avant | |
| 10,458,202 B2 * | 10/2019 | Dave | E21B 41/0085 |
| 10,851,805 B2 | 12/2020 | Thomson et al. | |
| 2004/0149448 A1 * | 8/2004 | Akselberg | E21B 34/10 166/373 |
| 2005/0178560 A1 * | 8/2005 | Johansen | E21B 33/0355 166/374 |
| 2014/0345851 A1 | 11/2014 | Wright et al. | |
| 2017/0122069 A1 | 5/2017 | Rytlewski et al. | |
| 2020/0284123 A1 | 9/2020 | Tveranger et al. | |
| 2020/0308932 A1 | 10/2020 | Vick, Jr. | |

FOREIGN PATENT DOCUMENTS

| | | |
|---|---|---|
| EP | 0992652 A2 | 4/2000 |
| GB | 2428707 A | 2/2007 |
| WO | 1998054439 A1 | 12/1998 |
| WO | 2017132104 A1 | 8/2017 |

OTHER PUBLICATIONS

International Search Report & Written Opinion in PCT/US2022/015849 dated Oct. 28, 2022.

* cited by examiner

*Primary Examiner* — Nicole Coy
*Assistant Examiner* — Nicholas D Wlodarski
(74) *Attorney, Agent, or Firm* — Barnes & Thornburg LLP

(57) ABSTRACT

A downhole device for applying and regulating pressure to a hydraulic device. The downhole device includes a relief check valve, a pressure transfer check valve, a hydraulic chamber, an output port, and a fluid separator. Pressure from the hydraulic chamber is applied to the hydraulic device to actuate the hydraulic device.

20 Claims, 3 Drawing Sheets

PASSIVE PRESSURE APPLICATION AND REGULATION OF DOWNHOLE HYDRAULIC DEVICES

TECHNICAL FIELD

The present disclosure relates generally to completion operations, and more particularly, to a downhole device used to passively apply and regulate pressure to coupled hydraulic devices without the use of surface control lines or pumps.

BACKGROUND

In order to actuate some downhole hydraulic devices, pressure may be applied via hydraulic control lines run from the surface. For completion operations, these hydraulic devices may be important for maintaining valves in specific positions as well as for monitoring the pressure in connected devices and control lines. In some wellbore operations, a potential for damage to the hydraulic lines may exist. The hydraulic control lines may be disposed externally on the production tubing while the completion is run in hole. This exposure may result in abrasion and the subsequent degradation of the hydraulic control lines as they descend down the wellbore.

Dual trip completions may pose an additional challenge as the lower completion is sometimes installed independently of the upper completion. In these operations, the lower completion may comprise the majority of the connected hydraulic control lines. As a result of this situation, it may be difficult to verify the integrity of the downhole hydraulic systems or the hydraulic control lines until the upper completion is installed later. If the hydraulic control lines have become damaged, repairs or replacement may be initiated resulting in a loss of productive time. The present invention provides improved apparatus and methods for applying and regulating pressure to downhole hydraulic devices in completion operations.

BRIEF DESCRIPTION OF THE DRAWINGS

Illustrative examples of the present disclosure are described in detail below with reference to the attached drawing figures, which are incorporated by reference herein, and wherein.

Figure 1:
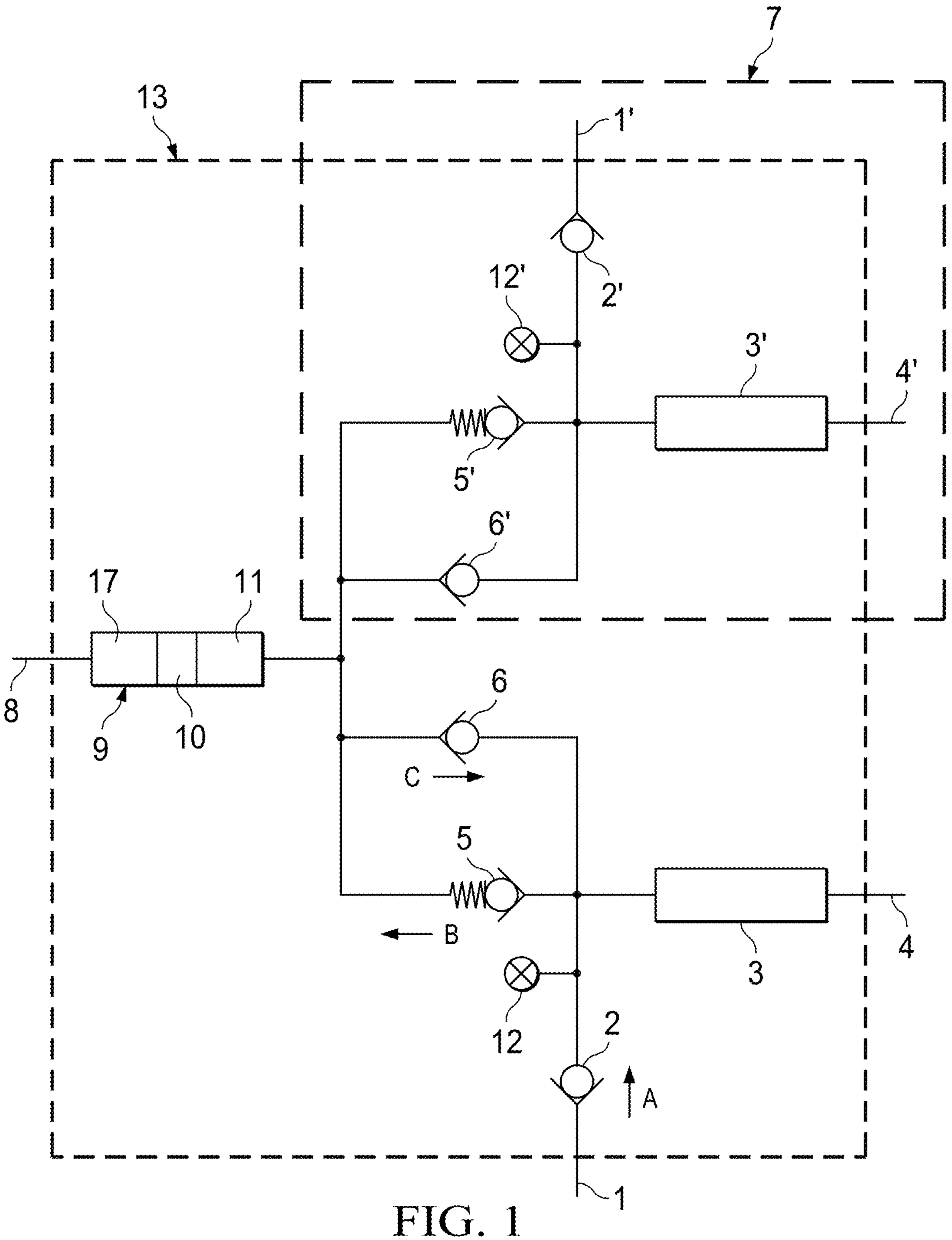
FIG. 1 is a schematic illustrating an example of a downhole device for applying and regulating pressure to a hydraulic device in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates generally to completion operations, and more particularly, to a downhole device used to passively apply and regulate pressure to coupled hydraulic devices without the use of surface control lines or pumps.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of a downhole tool to passively apply and regulate pressure to coupled hydraulic devices without the use of surface control lines or pumps. The downhole device may maintain a pre-determined applied pressure differential in one or more coupled hydraulic systems, control lines, or connected devices. The downhole device provides the functionality to actuate hydraulic devices and monitor the differential pressure conditions of the hydraulic devices to ensure the hydraulic chamber rating is not exceeded. Beneficially, the downhole device passively maintains a pre-determined differential pressure above that of the dynamically changing hydrostatic pressure, while the completion is run in the well, without the need for active pressure management from the surface or the use of active pressure management tools such as embedded pumps, mechanical tractors, mechanical overrides, and the like. Advantageously, the downhole device does not utilize surface control lines or downhole pumps to apply and regulate pressure to the hydraulic devices. As such, the risk to the surface control lines is thereby completely negated while the downhole tool is run in hole as there are no surface control lines needed. In addition, this allows the lower completion to be run using managed pressure drilling (hereafter "MPD"). MPD is an adaptive well pressure management technique that may utilize pressure equipment at the surface to form a seal around a smooth uniform outer surface of the drill string while the drill string is being lowered or raised. The downhole hole device does not utilize control lines conveyed from the surface, and thus MPD techniques may be used with the downhole device. This may include the use of drill pipe to anchor the lower completion while running in hole, and/or increasing the speed of deployment of the lower completion as opposed to running an entire completion with control lines in the annular area. Further, there may be no pump systems embedded in the downhole tool, thereby reducing system complexity. As a further advantage, the downhole device may be attached to a lower completion while it is run in the wellbore. In some operations, the lower completion comprises the greatest number of surface control lines, must be navigated through the narrower, deeper, more complex portion of the well, and is thus at the greatest risk of surface control line damage. The downhole device allows the lower completion to be run in hole either connected to or separate from an upper completion while maintaining sufficient hydraulic pressure to any connected hydraulic devices. As an additional advantage the downhole device allows for the monitoring of the control lines connecting the downhole device with the hydraulic devices to be actuated. As such, any damage to these coupled control lines may be conveyed to an operator on the surface via wireless telemetry and without the use of surface control lines. As there are no surface control lines connecting the downhole device to the surface, there is also a reduction in the amount of exposed control lines. As a further advantage, the downhole device may be charged at the surface to apply sufficient differential pressure to the connected control lines of the coupled hydraulic devices prior to the downhole device descending in the wellbore. The downhole device may also be recharged downhole by the thermal expansion of the hydraulic fluid in the downhole device. The downhole device may also utilize a pressure transfer from the hydrostatic pressure of the surrounding wellbore fluid to prevent a negative pressure differential occurring in the hydraulic chamber should insufficient thermal expansion occur. This pressure transfer from the wellbore fluid thus prevents the hydraulic chamber from being less pressurized than the hydrostatic pressure itself. The downhole device may also be recharged by applying pressure in the well via surface pressure application in the wellbore. One further advantage is that the hydraulic pressure of the downhole device and connected hydraulic devices may be monitored remotely to ensure the integrity of the devices and connected control lines. An additional advantage is that the downhole device reduces or eliminates the need for active pressure management of the connected hydraulic devices at the surface.

An example downhole device comprises at least two check valves, a hydraulic chamber, an output port, and a fluid separator. Optionally, the downhole device also comprises an input port and an input check valve preventing flowback through the input port. The input port is fluidically coupled to the input check valve. The input check valve is fluidically coupled to the hydraulic chamber, the relief check valve, and the pressure transfer check valve. The input check valve allows fluid flow to the hydraulic chamber, the relief check valve, and the pressure transfer check valve. The input check valve does not allow fluid flow to exit the input port from the hydraulic chamber. The relief check valve is fluidically coupled to the fluid separator and the hydraulic chamber. The relief check valve allows fluid flow to the fluid separator but does not allow fluid flow to the hydraulic chamber. The pressure transfer check valve is fluidically coupled to the hydraulic chamber and the fluid separator. The pressure transfer check valve allows fluid flow to the hydraulic chamber but does not allow fluid flow to the fluid separator. The hydraulic chamber stores hydraulic fluid to pressurize connected hydraulic devices. The hydraulic chamber is fluidically coupled to an output port. The output port is coupled to one or more hydraulic devices and configured to open to allow pressurized hydraulic fluid to flow to the hydraulic device(s). The fluid separator is fluidically coupled to an external port configured to allow wellbore fluid to enter or exit from the fluid separator. When the hydrostatic pressure of the surrounding wellbore fluid exceeds the pressure within the hydraulic chamber (i.e., the stored pressure and/or pressure generated by thermal expansion), the fluid separator allows the hydrostatic pressure to transfer to the hydraulic chamber by entering the fluid separator and acting on a piston which transfers pressure to the hydraulic fluid within the downhole device. Additionally, if the differential pressure within the hydraulic chamber builds to a sufficient degree to necessitate reduction (e.g., from thermal expansion), the relief check valve allows the excess hydraulic pressure to bleed off via a pressure transfer at the fluid separator. The relief check valve has a predetermined and set cracking pressure, flow pressure, and shut-off pressure. The relief check valve is selected to have a cracking pressure that is high enough to not open when the downhole device is initially charged at the surface. The relief check valve is also selected to bleed off the excess hydraulic pressure slowly to not lose excessive differential pressure in the system. The relief check valve is thus used to determine the pressure differential to be maintained in the hydraulic chamber.

FIG. 1 is a schematic illustrating an example downhole device in accordance with the examples disclosed herein. Downhole device, generally 13, may form part of a downhole tool such as a completion or may be a separate device coupled to the downhole tool. The downhole device 13 comprises input port 1. Input port 1 allows for the introduction of pressurized hydraulic fluid to the downhole device 13. The pressurized hydraulic fluid is introduced via input port 1 at the surface prior to introducing the downhole device 13 to a wellbore. The downhole device 13 may be charged at the surface until a sufficient desired pressure is achieved in the downhole device 13. The pressurized hydraulic fluid is passed through an input check valve 2 in the direction illustrated by arrow A. Input check valve 2 does not allow the hydraulic fluid to flow back in the direction of input port 1 and thus cannot exit the downhole device 13 via flow across input port 1. Input check valve 2 is fluidically coupled to a hydraulic chamber 3, a relief check valve 5, and a pressure transfer check valve 6. This fluidic coupling is accomplished through connected fluid conduits. The connected fluid conduits may be any conduit suitable for downhole use and of sufficient durability to convey the pressurized hydraulic fluid in a downhole environment. As the pressurized hydraulic fluid flows across input check valve 2, this pressurized hydraulic fluid energizes hydraulic chamber 3 and subsequently any control lines or hydraulic devices connected to the downhole device 13 via output port 4. Output port 4 is coupled to hydraulic chamber 3 and allows for pressurized hydraulic fluid to exit hydraulic chamber 3 and to enter any connected hydraulic device. The hydraulic device may be any device actuated by hydraulic pressure. Examples of the hydraulic device include but are not limited to well flow control valves, ball valves, setting tools, packers, and the like.

It is to be understood that input port 1 and input check valve 2 are optional components. Input pressure may alternatively be applied via a compensator (not illustrated), and/or temperature increases while the downhole device 13 is run in hole, and/or later applied via increasing the wellbore pressure. The compensator may be used to input and adjust the pressure for all of these alternatives. The input port 1 and input check valve 2 are optional components to optionally perform the initial pressurization at the surface and/or while testing the downhole device 13 prior to deployment. In some examples, the input port 1 and input check valve 2 may bypass the need for a compensator as illustrated in the example of FIG. 1.

The pressurized hydraulic fluid that flowed across input check valve 2 also acts against the relief check valve 5. As discussed above, the relief check valve 5 functions to relieve excess pressurization in the hydraulic chamber 3. The initial differential pressure created by charging the downhole device 13 at the surface is not sufficient to open the relief check valve 5, as the relief check valve 5 is selected to have a cracking pressure higher than this initial applied pressure. As such, this applied pressure does not flow across relief check valve 5, and flow does not occur in the direction indicated by arrow B. The pressurized hydraulic fluid also acts against the pressure transfer check valve 6 in a direction opposite to that indicated by arrow C. The pressure transfer check valve 6 is thus closed initially and does not allow fluid flow past it to the fluid separator 9 when the device is charged at the surface.

When the downhole device is ready to be introduced to the wellbore, the pressure applied to the input port 1 is removed and input check valve 2 closes thereby preventing fluid flow back to input port 1. This initial applied hydraulic pressure is thus maintained in the hydraulic chamber 3 and any devices or control lines connected to the hydraulic chamber 3 via the output port 4.

As the downhole device 13 descends in the wellbore, the wellbore temperature increases and thermal expansion of the hydraulic fluid occurs. As the pressurized hydraulic fluid expands from the increasing temperature, the downhole device 13 may be pressurized as the downhole device 13 descends downhole. This thermal expansion increases the differential pressure in hydraulic chamber 3 and consequently in any control lines and/or hydraulic devices connected to the hydraulic chamber 3 via output port 4. If sufficient thermal expansion occurs, the differential pressure acting against the relief check valve 5 bleeds this excess pressure in the direction of arrow B. The cracking, opening, and shut-off pressure of the relief check valve 5 are predetermined to allow a controlled bleed of the excess pressure created from thermal expansion of the hydraulic fluid and to prevent pressure exceeding the pressure rating of any connected devices. The cracking, opening, and shut-off pressure of the relief check valve 5 are also selected to allow a small flow rate and a fast response to bleed off the excess hydraulic pressure slowly without losing excessive differential pressure in the hydraulic chamber 3 and any connected hydraulic devices. As such, relief check valve 5 determines the pressure differential that is maintained in hydraulic chamber 3. The operator may tailor this desired pressure differential by adjusting and/or substituting different relief check valves 5 at the surface to maintain a desired differential pressure within hydraulic chamber 3. This may be done before the downhole device 13 is introduced to the wellbore.

As the downhole device 13 descends downhole, the hydrostatic pressure from the surrounding wellbore fluid also acts on the downhole device 13 via external port 8. External port 8 allows wellbore fluid to enter and exit fluid separator 9 to apply and relieve hydraulic pressure from the downhole device 13 via a pressure transfer at the fluid separator 9. Fluid separator 9 comprises two chambers 11 and 17 that are isolated from each other by movable structure 10. The hydrostatic pressure from the surrounding wellbore fluid entering chamber 17 acts on the moveable structure 10. Clean hydraulic fluid inside chamber 11 of the downhole device 13 is energized by the moveable structure 10, generating pressure equal to the pressure inside chamber 17. As the moveable structure 10 shifts position within the fluid separator 9, the pressure between the downhole device 13 and the hydrostatic pressure of the surrounding wellbore fluid also adjusts accordingly as pressure is transferred between the two chambers 11 and 17. The moveable structure 10 may be a piston, bellow, diaphragm, or other similar structure configured to isolate the two chambers 11 and 17 and transfer pressure therebetween. When the differential pressure created from thermal expansion in the downhole device 13 exceeds the differential pressure rating of the relief valve 5, the pressure transfer check valve 6 remains closed and pressure may be bled off via the relief check valve 5 if said pressure differential is sufficiently excessive as discussed above.

The relief check valve 5 only allows fluid flow in the direction of arrow B. While the downhole device 13 descends downhole, any excess pressure may flow intermittently via relief check valve 5. A sensor 12 may be used to monitor the hydraulic pressure in the hydraulic chamber 3. The downhole device 13 may be held stationary to obtain a static pressure reading of the hydraulic chamber 3 in some operations.

As the downhole device 13 descends in the wellbore, the trapped hydraulic fluid will expand when heated. As the volume of the hydraulic fluid is constrained, the volumetric expansion of the hydraulic fluid creates a pressure increase within the constraining system. The downhole device 13 utilizes this volumetric expansion to generate pressure. A sufficient temperature increase will create greater fluid expansion relative to the compression of fluid generated by the hydrostatic wellbore pressure, thereby maintaining a pressure in the hydraulic chamber greater than the hydrostatic pressure. This effect subsequently creates a positive pressure differential in the hydraulic chamber compared to the downhole hydrostatic pressure.

When the thermal expansion of the hydraulic fluid in the hydraulic chamber 3 does not exceed the hydrostatic pressure, the differential pressure across the pressure transfer check valve 6 reduces. This reduction causes the differential pressure to equalize between the hydrostatic pressure acting on fluid separator 9 and the hydraulic pressure within the hydraulic chamber 3. This equalization is due to flow across pressure transfer check valve 6. If a temperature increase in the wellbore occurs, thermal expansion of the hydraulic fluid increases the differential pressure in the hydraulic chamber 3 which will reseat and close the pressure transfer check valve 6 and allow the differential pressure in the hydraulic chamber 3 to increase again. Alternatively, if pressure is applied in the well above the hydrostatic pressure, the applied pressure to the external port 8 increases. Then the pressure within the downhole device 13 will also increase via a pressure transfer at the fluid separator 9 and fluid flow across the pressure transfer check valve 6. When this applied pressure is removed, the pressure transfer check valve 6 closes again, but this transferred applied pressure remains inside the hydraulic chamber 3 thereby recharging the hydraulic chamber 3.

Additional sub-circuits may be added to accommodate additional hydraulic devices or systems that require a different pressure differential to be maintained. As discussed above, the maintained differential pressure is determined by the cracking, flow, and shut-off pressure of the relief check valve 5. A second sub-circuit, sub-circuit 7, is illustrated as a subassembly of the downhole device 13 of FIG. 1. Sub-circuit 7 comprises duplicated components of input port 1', input check valve 2', relief check valve 5', pressure transfer check valve 6', hydraulic chamber 3', and output port 4'. Fluid separator 9 is not duplicated and may be shared between sub-circuits. Sub-circuit 7 maintains pressure to a different hydraulic device via output port 4' and the duplicated components function analogously to those described above; however, the pressure differential maintained by relief check valve 5' is different than the pressure differential maintained by relief check valve 5. Pressure transfer check valve 6' may also be adjusted or replaced by an additional relief valve or similar, to determine the minimum applied pressure applied via external port 8 that will be required to transfer fluid from hydraulic chamber 11 to hydraulic chamber 3. It is to be understood that sub-circuit 7 and any additional sub-circuits are optional, and the downhole device 13 may consist solely of the one circuit already described. As many or as few sub-circuits may be added as desired to maintain pressure in as many hydraulic devices as desired.

In the illustration of FIG. 1, downhole device 13 is not coupled to a surface hydraulic line or a pump to apply and regulate pressure. Downhole device 13 may optionally be connected to the surface using wireless or wired telemetry. An example of a wired connection is an electric line. Alternatively, or in addition to, downhole device 13 may communicate with the surface using acoustic telemetry. The data obtained via sensor 12, or any other sensors, may be communicated to the surface via the electric line or acoustic telemetry. Electronics complete with downhole power such as batteries may be utilized in close proximity to the downhole device 13 to store data acquired via sensor 12 and retrieved from the downhole device 13 at a later date or communicated to surface as previously described with use of electric line or acoustic telemetry.

Check valves 2, 5, and 6 may be any check valves sufficient for downhole use and suitable for operation in the downhole device 13. Examples of the check valves 2, 5, and 6 include but are not limited to non-return valves, reflux valves, retention valves, one-way valves, or any combination thereof. In addition, check valves 2, 5, and 6 can be substituted for alternative hydraulic flow control valves that may include, but are not limited to pressure relief valves, shuttle valves, solenoid operated valves, or any combination thereof.

Fluid separator 9 may be any fluid separator sufficient for downhole use and suitable for operation in the downhole device 13. Examples of the fluid separator 9 may include but are not limited to a balance piston, diaphragm, a bellow, or a combination thereof. The function of the fluid separator 9 is to maintain fluid separation between wellbore fluids entering external port 8 and the clean internal hydraulic fluid contained within hydraulic chamber 11. Fluid separator 9 also transfers the pressure via external port 8 to hydraulic chamber 11 via the moveable structure 10. Fluid separator 9 is an optional component that is not required for the downhole device 13 to function and may not be used if there is no concern with the cleanliness of the fluid. In such an example, fluid may enter external port 8 and communicate directly with check valves 2, 5 and 6.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
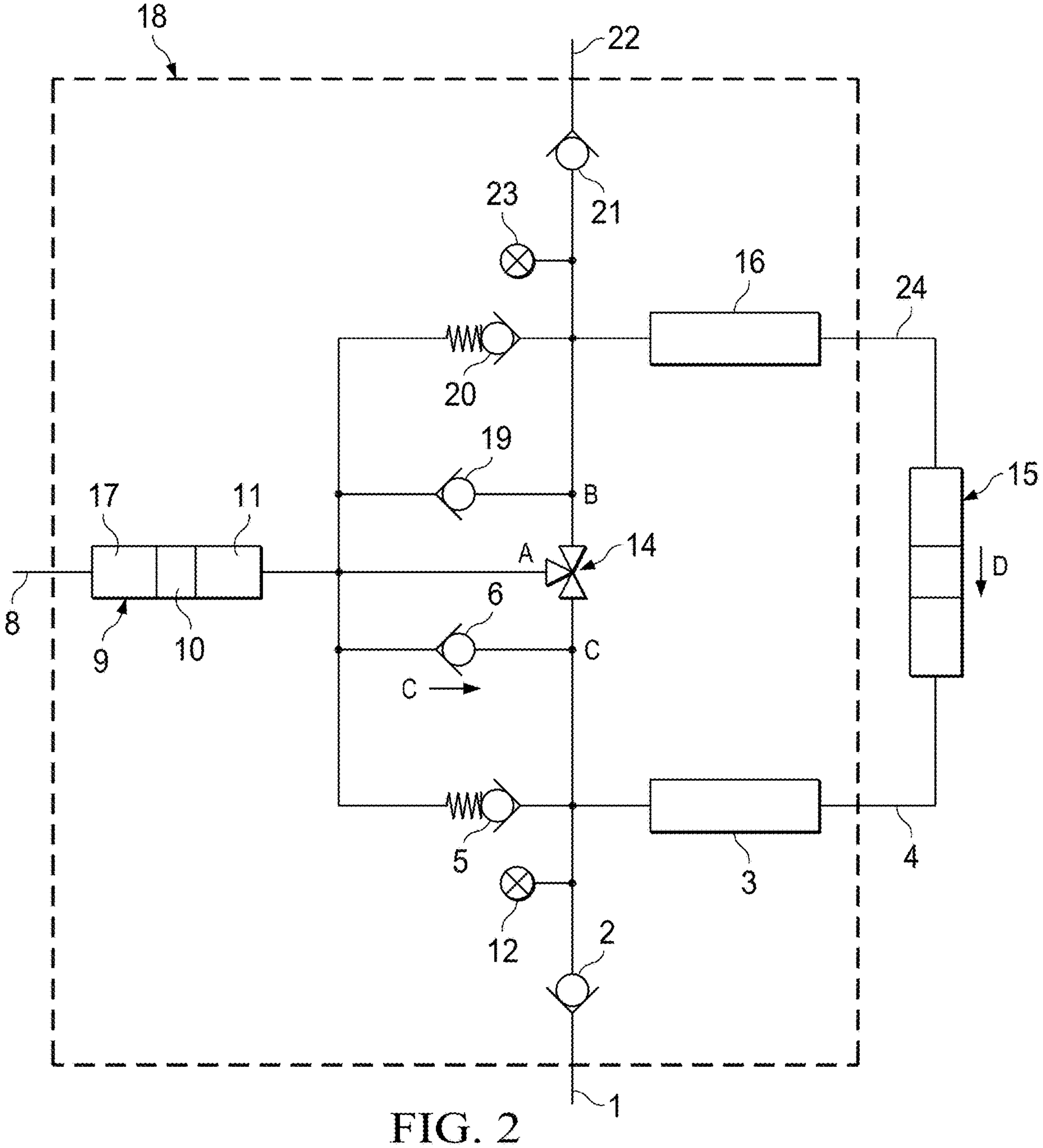
FIG. 2 is a schematic illustrating another example of a downhole device for applying and regulating pressure to a hydraulic device in accordance with the examples disclosed herein.

FIG. 2 is a schematic illustrating an alternative example of a downhole device, generally 18, in accordance with the examples disclosed herein. Downhole device 18 is similar to the downhole device 13 illustrated in FIG. 1 and comprises an input port 1, an input check valve 2, a relief check valve 5, a pressure transfer check valve 6, a hydraulic chamber 3, an output port 4, and a fluid separator 9 coupled to external port 8. These same numbered components function analogously to their counterparts illustrated in FIG. 1.

Downhole device 18 additionally comprises a selective valve 14, a second hydraulic chamber 16, a second pressure transfer check valve 19, a second relief check valve 20, a second input check valve 21, a second input port 22, a second sensor 23, and a second output port 24. Pressure transfer check valve 19 functions analogously to pressure transfer check valve 6. Relief check valve 20 functions analogously to relief check valve 5, however, whereas as relief check valve 5 is selected to determine the pressure differential to be maintained in hydraulic chamber 3, relief check valve 20 is selected to determine the pressure differential to be maintained in hydraulic chamber 16. The pressure to be maintained in hydraulic chamber 16 may be the same or different from the pressure to be maintained in hydraulic chamber 3. Hydraulic chamber 16 functions analogously to hydraulic chamber 3. Output port 24 functions analogously to output port 4. Input check valve 21 functions analogously to input check valve 2. Input port 22 functions analogously to input port 1. Input port 22 is used to pressurize and charge hydraulic chamber 16 before the downhole device 18 is introduced to the wellbore. The input check valve 21 prevents the pressurized hydraulic fluid from flowing back out of input port 22 when the downhole device 18 is run in hole. As discussed above with FIG. 1, the input port 1, input check valve 2, input port 22, and input check valve 21 are optional components that may not be present in all examples.

The downhole device 18 additionally comprises the selective valve 14. With the addition of selective valve 14, the relief check valve 5 and relief check valve 20 may be selectively bypassed. Selectively bypassing relief check valve 5 or relief check valve 20 also selectively equalizes the respective pressure in the connected hydraulic chamber 3 or 16 with the hydrostatic pressure, resulting in the bleeding of the differential pressure in the selected hydraulic chamber 3 or 16. A hydraulic device is coupled to downhole device 18 and comprises a piston 15. Piston 15 represents a hydraulic piston that forms part of a hydraulically actuated device that is connected externally to the downhole device 18. As just discussed, actuating the selective valve 14 will selectively bleed the hydraulic pressure in either hydraulic chamber 3 or 16. Pressure is maintained on the side of the piston 15 coupled to the non-bled hydraulic chamber while pressure is reduced on the opposing side of the piston 15 which is coupled to the hydraulic chamber that selectively bled its pressure. This pressure differential results in shifting the piston 15 in the selected direction. The translation of piston 15 will then actuate the hydraulic device on command Closing the selective valve 14 and allowing thermal expansion to recharge the selectively bled hydraulic chamber 3 or 16. Recharging the bled hydraulic chamber 3 or 16 reapplies pressure to both sides of the piston 15. Additionally, the application of transferred pressure via fluid separator 9 may maintain and/or increase the pressure within hydraulic chambers 3 or 16 above the hydrostatic pressure.

To actuate piston 15, selective valve 14 is operated to allow hydraulic pressure already stored in the first hydraulic chamber 3 to bypass the relief check valve 5. This selective bypass is performed by opening the selective valve 14 in the direction of C to A as illustrated in FIG. 2. The pressurized hydraulic fluid enters entrance C of the selective valve 14 and exits via exit A of the selective valve 14. The pressurized hydraulic fluid may be bled from hydraulic chamber 3 on command by bypassing relief check valve 5 thereby ignoring its selected cracking and flow pressure values.

Bleeding pressure from hydraulic chamber 3 creates a pressure differential across the piston 15 as the higher pressure in hydraulic chamber 16 will drive the piston 15 in the direction indicated by arrow D. Opening the selective valve 14 in the direction of B to A would have moved the piston 15 in the opposite direction indicated by arrow D by bypassing the relief check valve 20 in an analogous manner to the bypassing of relief check valve 5 as discussed above.

Movement of the piston 15 in one direction actuates the coupled hydraulic device to perform an action. Movement of the piston 15 in the opposing direction actuates the coupled hydraulic device to stop performing the action or to perform a different action.

In order to reset the downhole device 18 for future actuations, the selective valve 14 is closed. Thermal expansion may then occur to recharge hydraulic chambers 3 and 16. Alternatively, pressure may be applied via a pressure transfer from the hydrostatic pressure via fluid separator 9 as discussed in FIG. 1.

In the illustration of FIG. 2, downhole device 18 is not coupled to a surface hydraulic line or a pump to apply and regulate pressure. Downhole device 18 may optionally be connected to the surface via wire or wireless telemetry. An example of wired telemetry is an electric line. Alternatively, or in addition to, downhole device 18 may communicate with the surface using acoustic telemetry. The data obtained via sensors 12, 23, or any other sensors may be communicated to the surface via the electric line or acoustic telemetry. Selective valve 14 may also be controlled via the electric line and/or acoustic telemetry.

Check valves 19, 20, and 21 may be any check valve sufficient for downhole use and suitable for operation in downhole device 18. Examples of the check valves include but are not limited to non-return valves, reflux valves, retention valves, one-way valves, or any combination thereof. In addition, check valves 19, 20, and 21 may be substituted for alternative hydraulic flow control valves that including but not limited to pressure relief valves, shuttle valves, solenoid operated valves, or any combination thereof.

Selective valve 14 may be any valve configured to select between at least two different valve fluid pathways. Examples of selective valve 14 include, but are not limited to, a spool valve, a solenoid valve, or a rupture disc.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
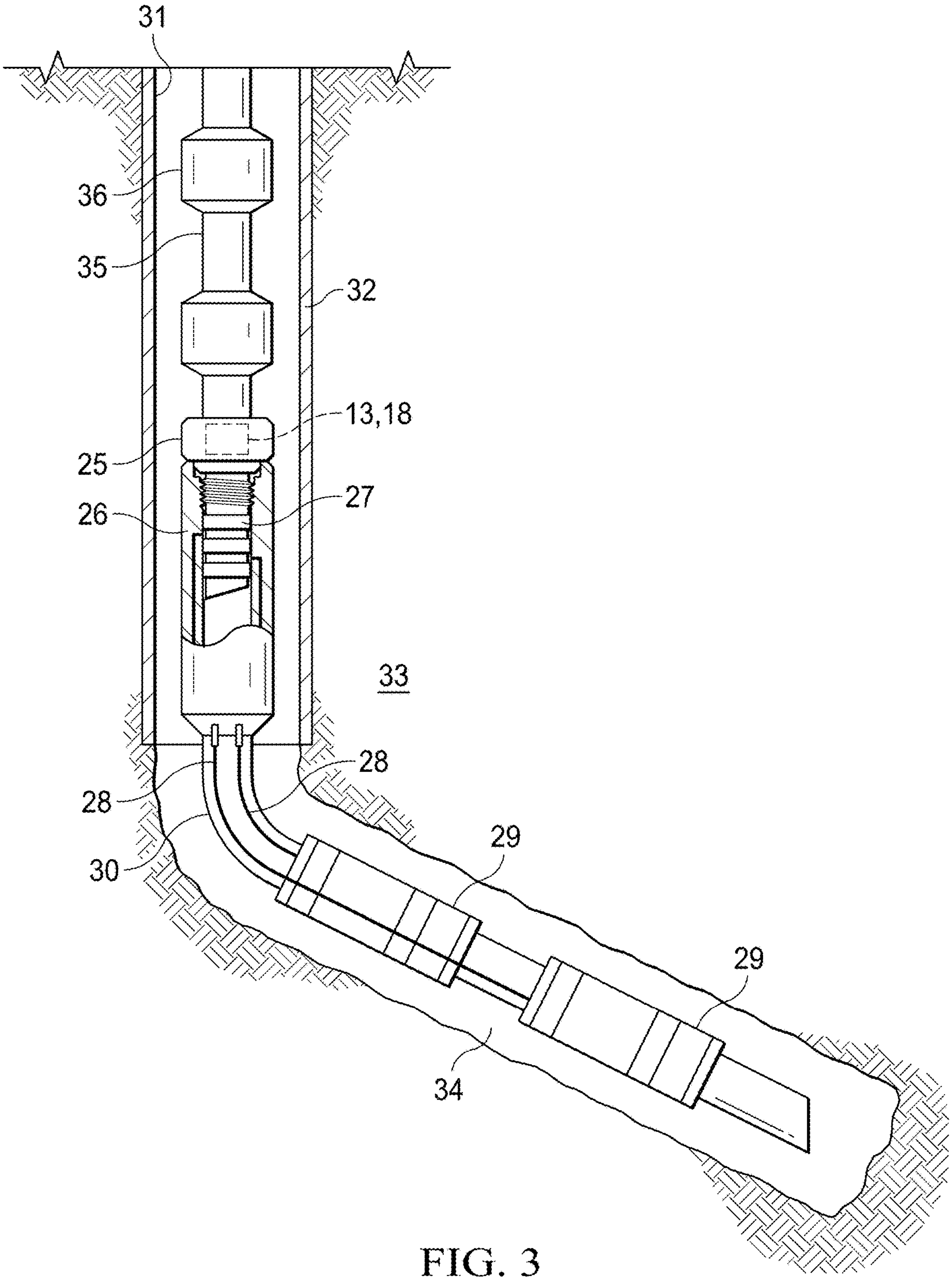
FIG. 3 illustrates an example dual completion system incorporating the downhole device in accordance with the examples disclosed herein.

FIG. 3 illustrates an example dual trip completion schematic where the downhole device 13 or 18 forms part of a running tool 25. FIG. 3 illustrates a wellbore 31 which may comprise well casing 32 and which penetrates subterranean formation 33. The wellbore 31 may also comprise an open hole section 34 which lacks casing 32 and is where the lower completion 30 may enter the subterranean formation 33 without the well structure formed by casing 32. The upper completion 35 may comprise tubing, drill pipe, or another conduit coupled to the running tool 25. The upper completion 35 may also comprise wireless telemetry modules 36 to transfer information to or from the downhole device 13 or 18 inside the running tool 25 to the surface. The running tool 25 is anchored to the lower completion hydraulic receptacle 26 prior to entering the wellbore 31 or is later inserted into the wellbore 31 to engage with the lower completion hydraulic receptacle 26. The downhole device 13 or 18 and necessary hydraulic output ports 4, 4' or 24 (obscured by the hydraulic receptacle 26 and not illustrated) contained within the running tool 25 interface with the hydraulic seals 27 that route hydraulic pressure to connected hydraulic devices 29 via control lines 28 in the lower completion 30.

It should be clearly understood that the example method illustrated by FIG. 3 is merely a general application of the principles of this disclosure in practice, and a wide variety of other examples are possible. Therefore, the scope of this disclosure is not limited in any manner to the details of FIG. 3 as described herein.

It is also to be recognized that the disclosed downhole devices may also directly or indirectly affect the various downhole equipment and tools that may contact or otherwise interact with the downhole devices disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are downhole devices for applying and regulating pressure to hydraulic devices in accordance with the disclosure and the illustrated FIGs. An example downhole device comprises a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve. The downhole device further comprises a pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure may be transferred to the hydraulic chamber from the fluid separator via the pressure transfer check valve. The downhole device additionally comprises the hydraulic chamber; wherein the hydraulic chamber stores hydraulic fluid and is fluidically coupled to an outport port; wherein the stored hydraulic fluid actuates the hydraulic device. The downhole device further comprises the output port; wherein the output port is coupled to the hydraulic device and configured to open to allow hydraulic fluid to flow to the hydraulic device to actuate the hydraulic device. The downhole device comprises the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively.

Additionally or alternatively, the downhole device may include one or more of the following features individually or in combination. The downhole device may further comprise a solenoid valve fluidically coupled to the hydraulic chamber and the fluid separator and configured to open and allow hydraulic fluid to flow from the hydraulic chamber to the fluid separator thereby bypassing the relief check valve. The hydraulic chamber may be a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve. The solenoid valve may open to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction. The hydraulic device may be a first hydraulic device; wherein the relief check valve, pressure transfer check valve, the hydraulic chamber, and the output port form a first sub-circuit; wherein the downhole device comprises a second sub-circuit duplicating the components and coupled arrangement of the first sub-circuit; wherein the output port of the second sub-circuit is coupled to a second hydraulic device different from the first hydraulic device. The fluid separator may comprise a piston, diaphragm, a bellow, or a combination thereof. The downhole device may further comprise a sensor to monitor the pressure in the hydraulic chamber.

Provided are methods for applying and regulating pressure to hydraulic devices in accordance with the disclosure and the illustrated FIGs. An example method comprises introducing a downhole device into a wellbore. The downhole device comprises a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve. The downhole device further comprises a pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure may be transferred to the hydraulic chamber from the fluid separator via the pressure transfer check valve. The downhole device additionally comprises the hydraulic chamber; wherein the hydraulic chamber stores hydraulic fluid and is fluidically coupled to an outport port; wherein the stored hydraulic fluid actuates the hydraulic device. The downhole device further comprises the output port; wherein the output port is coupled to the hydraulic device and configured to open to allow hydraulic fluid to flow to the hydraulic device to actuate the hydraulic device. The downhole device comprises the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively. The method further comprises applying pressure to the hydraulic device from the hydraulic chamber.

Additionally or alternatively, the method may include one or more of the following features individually or in combination. The method may further comprise flowing hydraulic fluid from the hydraulic chamber across the relief check valve when the hydraulic pressure in the hydraulic chamber exceeds the cracking pressure of the relief check valve. The flowing the hydraulic fluid from the hydraulic chamber across the relief check valve may occur when thermal expansion of the hydraulic fluid in the hydraulic chamber creates a pressure differential with the hydrostatic pressure of the wellbore. The method may further comprise flowing hydraulic fluid from the fluid separator across the pressure transfer check valve when a hydrostatic pressure of the wellbore exceeds the pressure in the hydraulic chamber. The downhole device may further comprise a solenoid valve fluidically coupled to the hydraulic chamber and the fluid separator and configured to open and allow hydraulic fluid to flow from the hydraulic chamber to the fluid separator thereby bypassing the relief check valve. The hydraulic chamber may be a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve. The solenoid valve may open to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction. The hydraulic device may be a first hydraulic device; wherein the relief check valve, pressure transfer check valve, the hydraulic chamber, and the output port form a first sub-circuit; wherein the downhole device comprises a second sub-circuit duplicating the components and coupled arrangement of the first sub-circuit; wherein the output port of the second sub-circuit is coupled to a second hydraulic device different from the first hydraulic device. The fluid separator may comprise a piston, diaphragm, a bellow, or a combination thereof. The downhole device may further comprise a sensor to monitor the pressure in the hydraulic chamber.

Provided are systems for applying and regulating pressure to hydraulic devices in accordance with the disclosure and the illustrated FIGs. An example system comprises a downhole device. The downhole device comprises a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve. The downhole device further comprises a pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure may be transferred to the hydraulic chamber from the fluid separator via the pressure transfer check valve. The downhole device additionally comprises the hydraulic chamber; wherein the hydraulic chamber stores hydraulic fluid and is fluidically coupled to an outport port; wherein the stored hydraulic fluid actuates the hydraulic device. The downhole device further comprises the output port; wherein the output port is coupled to the hydraulic device and configured to open to allow hydraulic fluid to flow to the hydraulic device to actuate the hydraulic device. The downhole device comprises the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively. The system further comprises a completion coupled to the downhole device.

Additionally or alternatively, the system may include one or more of the following features individually or in combination. The completion may be divided into a lower completion and an upper completion and wherein the downhole device is coupled to the lower completion. The downhole device may further comprise a solenoid valve fluidically coupled to the hydraulic chamber and the fluid separator and configured to open and allow hydraulic fluid to flow from the hydraulic chamber to the fluid separator thereby bypassing the relief check valve. The hydraulic chamber may be a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve. The solenoid valve may open to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction. The hydraulic device may be a first hydraulic device; wherein the relief check valve, pressure transfer check valve, the hydraulic chamber, and the output port form a first sub-circuit; wherein the downhole device comprises a second sub-circuit duplicating the components and coupled arrangement of the first sub-circuit; wherein the output port of the second sub-circuit is coupled to a second hydraulic device different from the first hydraulic device. The fluid separator may comprise a piston, diaphragm, a bellow, or a combination thereof. The downhole device may further comprise a sensor to monitor the pressure in the hydraulic chamber.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A downhole device for applying and regulating pressure to a hydraulic device, the downhole device comprising:

a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve;

a pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure is transferred to the hydraulic chamber from the fluid separator via the pressure transfer check valve;

the hydraulic chamber; wherein the hydraulic chamber stores hydraulic fluid and is fluidically coupled to an outport port; wherein the stored hydraulic fluid actuates the hydraulic device;

the output port; wherein the output port is coupled to the hydraulic device and configured to open to allow hydraulic fluid to flow to the hydraulic device to actuate the hydraulic device;

the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively; and a solenoid valve fluidically coupled to the hydraulic chamber and the fluid separator and configured to open and allow hydraulic fluid to flow from the hydraulic chamber to the fluid separator thereby bypassing the relief check valve.

2. The downhole device of claim 1, wherein the hydraulic chamber is a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve.

3. The downhole device of claim 2, wherein when the solenoid valve opens to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction.

4. The downhole device of claim 1, wherein the hydraulic device is a first hydraulic device; wherein the relief check valve, pressure transfer check valve, the hydraulic chamber, and the output port form a first sub-circuit; wherein the downhole device comprises a second sub-circuit duplicating the components and coupled arrangement of the first sub-circuit; wherein an output port of the second sub-circuit is coupled to a second hydraulic device different from the first hydraulic device.

5. The downhole device of claim 1, wherein the fluid separator comprises a piston, diaphragm, a bellow, or a combination thereof.

6. The downhole device of claim 1, further comprising a sensor to monitor the pressure in the hydraulic chamber.

7. A method for applying and regulating pressure to a hydraulic device, the method comprising:

introducing a downhole device into a wellbore, the downhole device comprising:

a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve;

a pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure is transferred to the hydraulic chamber from the fluid separator via the pressure transfer check valve;

the hydraulic chamber; wherein the hydraulic chamber stores hydraulic fluid and is fluidically coupled to an outport port; wherein the stored hydraulic fluid actuates the hydraulic device;

the output port; wherein the output port is coupled to the hydraulic device and configured to open to allow hydraulic fluid to flow to the hydraulic device to actuate the hydraulic device;

the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively; and a solenoid valve fluidically coupled to the hydraulic chamber and the fluid separator and configured to open and allow hydraulic fluid to flow from the hydraulic chamber to the fluid separator thereby bypassing the relief check valve; and applying pressure to the hydraulic device from the hydraulic chamber.

8. The method of claim 7, wherein the downhole device further comprises an input port and an input check valve.

9. The method of claim 7, further comprising flowing hydraulic fluid from the hydraulic chamber across the relief check valve when the hydraulic pressure in the hydraulic chamber exceeds the cracking pressure of the relief check valve.

10. The method of claim 7, wherein the flowing hydraulic fluid from the hydraulic chamber across the relief check valve occurs when thermal expansion of the hydraulic fluid in the hydraulic chamber creates a pressure differential with the hydrostatic pressure of the wellbore.

11. The method of claim 7, further comprising flowing hydraulic fluid from the fluid separator across the pressure transfer check valve when a hydrostatic pressure of the wellbore exceeds the pressure in the hydraulic chamber.

12. The method of claim 7, wherein the hydraulic chamber is a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve.

13. The method of claim 12, wherein when the solenoid valve opens to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction.

14. The method of claim 7, wherein the fluid separator comprises a piston, diaphragm, a bellow, or a combination thereof.

15. The method of claim 7, wherein the downhole device further comprises a sensor to monitor the pressure in the hydraulic chamber.

16. A system for applying and regulating pressure to hydraulic devices, the system comprising:

a downhole device comprising:

a relief check valve; wherein the relief check valve is fluidically coupled to a fluid separator and a hydraulic chamber; wherein the relief check valve allows fluid flow to the fluid separator but does not allow fluid flow to the hydraulic chamber; wherein hydraulic pressure in the hydraulic chamber that exceeds a cracking pressure of the relief check valve is bled from the hydraulic chamber by the relief check valve;

the pressure transfer check valve; wherein the pressure transfer check valve is fluidically coupled to the hydraulic chamber and the fluid separator; wherein the pressure transfer check valve allows fluid flow to the hydraulic chamber but does not allow fluid flow to the fluid separator; wherein hydraulic pressure is transferred to the hydraulic chamber from the fluid separator via the pressure transfer check valve;

the hydraulic chamber; wherein the hydraulic chamber stores hydraulic fluid and is fluidically coupled to an outport port; wherein the stored hydraulic fluid actuates the hydraulic device;

the output port; wherein the output port is coupled to the hydraulic device and configured to open to allow hydraulic fluid to flow to the hydraulic device to actuate the hydraulic device;

the fluid separator; wherein the fluid separator is fluidically coupled to an external port configured to allow wellbore fluid to enter and exit from the fluid separator to transfer or relieve hydraulic pressure from the hydraulic chamber via the pressure transfer check valve or the relief check valve respectively; and a solenoid valve fluidically coupled to the hydraulic chamber and the fluid separator and configured to open and allow hydraulic fluid to flow from the hydraulic chamber to the fluid separator thereby bypassing the relief check valve; and a completion coupled to the downhole device.

17. The system of claim 16, wherein the hydraulic chamber is a first hydraulic chamber; wherein the relief check valve is a first relief check valve; wherein the downhole device further comprises a second hydraulic chamber and a second relief check valve; wherein the second hydraulic chamber and the first hydraulic chamber are connected to a piston of the hydraulic device; wherein the second relief check valve is fluidically coupled to the fluid separator and the second hydraulic chamber; wherein the second relief check valve allows fluid flow to the fluid separator but does not allow fluid flow to the second hydraulic chamber; wherein the solenoid valve is configured to open and allow hydraulic fluid to flow from the second hydraulic chamber to the fluid separator thereby bypassing the second relief check valve; wherein the solenoid valve is configured to open and allow hydraulic fluid to flow from the first hydraulic chamber to the fluid separator thereby bypassing the first relief check valve.

18. The system of claim 17, wherein when the solenoid valve opens to bypass the first relief check valve, hydraulic pressure decreases in the first hydraulic chamber thereby translating the piston of the hydraulic device in a first direction; wherein when the solenoid valve opens to bypass the second relief check valve, hydraulic pressure decreases in the second hydraulic chamber thereby translating the piston of the hydraulic device in a second direction opposite the first direction.

19. The system of claim 16, wherein the completion is divided into a lower completion and an upper completion and wherein the downhole device is coupled to the lower completion.

20. The system of claim 16, wherein the fluid separator comprises a piston, diaphragm, a bellow, or a combination thereof.

* * * * *